(12) United States Patent
Dunn (10) Patent No.: US 11,985,222 B2
(45) Date of Patent: May 14, 2024

(54) TRANSPARENT DATA ENCRYPTION

(71) Applicant: QSC, LLC, Costa Mesa, CA (US)

(72) Inventor: John Warren Dunn, Boulder, CO (US)

(73) Assignee: QSC, LLC, Costa Mesa, CA (US)

( * ) Notice: Subject to any disclaimer, the term of this patent is extended or adjusted under 35 U.S.C. 154(b) by 307 days.

(21) Appl. No.: 17/481,156

(22) Filed: Sep. 21, 2021

(65) Prior Publication Data

US 2022/0094523 A1 Mar. 24, 2022

Related U.S. Application Data (60) Provisional application No. 63/081,822, filed on Sep. 22, 2020.

(51) Int. Cl.
| | | |
|---|---|---|
| H04L 9/06 | (2006.01) | |
| G06F 3/16 | (2006.01) | |
| H04L 9/08 | (2006.01) | |
| H04L 9/32 | (2006.01) | |

(52) U.S. Cl.
CPC ............ *H04L 9/0631* (2013.01); *G06F 3/165* (2013.01); *H04L 9/0819* (2013.01); *H04L 9/3242* (2013.01)

(58) Field of Classification Search
CPC ... H04L 9/0631; H04L 9/0819; H04L 9/3242; G06F 3/165
USPC ....................................................... 713/171
See application file for complete search history.

(56) References Cited

U.S. PATENT DOCUMENTS

| | | | | |
|---|---|---|---|---|
| 7,580,520 B2* | 8/2009 | Apostolopoulos | ..... | H04N 19/30 |
| | | | | 380/42 |
| 9,564,136 B2* | 2/2017 | Fejzo | ...................... | G10L 19/24 |
| 10,103,839 B2* | 10/2018 | Nikkila | ................... | H04L 1/007 |
| 11,533,272 B1* | 12/2022 | Sastry | ................... | G06F 1/3203 |
| 2001/0034770 A1 | 10/2001 | O'Brien | | |
| 2005/0180563 A1* | 8/2005 | Apostolopoulos | .......................... | |
| | | | | H04N 21/23476 |
| | | | | 713/181 |
| 2009/0157876 A1* | 6/2009 | Lection | ................ | G06Q 20/123 |
| | | | | 709/225 |
| 2009/0326962 A1* | 12/2009 | Chen | ....................... | G10L 19/02 |
| | | | | 704/E21.001 |
| 2010/0027819 A1 | 2/2010 | Van Den Berghe et al. | | |
| 2015/0189008 A1* | 7/2015 | Karkkainen | ............. | H04N 7/15 |
| | | | | 709/204 |
| 2015/0249468 A1* | 9/2015 | Nikkila | ................... | H04L 1/004 |
| | | | | 714/746 |
| 2015/0255076 A1* | 9/2015 | Fejzo | ..................... | G10L 19/24 |
| | | | | 704/500 |

(Continued)

OTHER PUBLICATIONS

International Searching Authority, International Search Report and Written Opinion, PCT Patent Application PCT/US2021/051352, dated Dec. 27, 2021, 12 pages.

*Primary Examiner* — Philip J Chea
*Assistant Examiner* — Ghizlane Maazouz
(74) *Attorney, Agent, or Firm* — Perkins Coie LLP (57) ABSTRACT

Disclosed herein is a data encryption technique that pertains to a data stream that divides into data samples. Each sample is truncated by a predetermined number of bits to make room in the data stream for an encryption data packet. The truncation reduces the resolution of the data in exchange for security features. The encryption data packet includes a counter to prevent replay attacks and an HMAC to verify contents and synchronize the frames of the data stream. The data is encrypted and transmitted to a receiver where the data is played.

20 Claims, 11 Drawing Sheets

(56) References Cited

U.S. PATENT DOCUMENTS

| | | |
|---|---|---|
| 2016/0042741 A1 | 2/2016 | Vestergaard et al. |
| 2018/0003794 A1 | 1/2018 | Raghupathy et al. |
| 2018/0242015 A1 | 8/2018 | Katsavounidis |
| 2021/0076098 A1* | 3/2021 | Espeland ............ H04N 21/4384 |
| 2021/0225364 A1* | 7/2021 | Petluru .................... G09B 5/06 |
| 2021/0377623 A1* | 12/2021 | Larson ................. H04N 21/239 |
| 2022/0086203 A1* | 3/2022 | Morris ................... H04N 7/157 |
| 2023/0231721 A1* | 7/2023 | Liang ................ H04N 21/2347 |
| | | 713/170 |

\* cited by examiner

| 1, 24-bit | 2 | 3 | 4 |
|---|---|---|---|
| 5 | ... | | |
| | | | |
| | | | |
| | | | |
| | | | |
| | | | |
| | | | |
| | | | |
| | | | |
| | | | |
| | | | |
| | | | |
| | | ... | 64 |

TRANSPARENT DATA ENCRYPTION

CROSS REFERENCE TO RELATED APPLICATIONS

This application claims the benefit of and priority to U.S. Provisional Patent Application No. 63/081,822, titled TRANSPARENT DATA ENCRYPTION, and filed Sep. 22, 2020, which is incorporated herein by reference in its entirety.

TECHNICAL FIELD

The present disclosure is directed to encryption of a data stream, and more specifically, pulse-code modulation (PCM) audio data, such as PCM audio related to live, streaming audio.

BACKGROUND

Digital and PCM audio are frequently used in streaming audio contexts. The streaming audio data is frequently streamed in 12, 16, or 24-bit variations. Some restrictions apply to streamed audio, such as the inability to add data, and the ability to throw away some of the data. In some circumstances the packet frame size is also fixed (e.g., 64, 128, or 256 bit).

BRIEF DESCRIPTION OF THE DRAWINGS

FIGS. 6A-F are block illustrations of various steps of some implementations of the disclosed protocol wherein:

The technology and techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to encryption of data streams. Some embodiments pertain to digital or PCM live streaming audio data. Raw streamed audio data is not encrypted and may be vulnerable to attacks on compromised devices. Common protocols for encryption make use of 128-bit frames (though other frame sizes are feasible). The size is based on common ciphers, such as Advanced Encryption Standard (AES) that process 128-bits at time. PCM audio is typically not encrypted and may be boundaryless (e.g., there is no need for an indication of where in an audio stream the receiver is). However, when PCM audio is encrypted, the audio must necessarily be decrypted to be played. Decryption of the PCM audio must be precise with respect to sample boundaries or the data will not decrypt correctly. The transmitted audio data stream is received by a receiver, although the receiver is not able to automatically determine the start of the 128-bit boundary so some sort of signaling must be used.

Disclosed herein is a protocol to encrypt audio over an existing digital audio link (ex: Audinate Dante®, AES-3, AES-67 or QSC Q-LAN™). Audio interfaces, like AES-3, do not include any encryption features. One cannot increase the number of bits in a stream; however, by reducing the bit depth of the audio data (e.g., from 24 to 22, or 20), one makes space for new data. By reducing each audio sample by 2 bits, enough bits are conserved for a frame of new, encryption data every 12th frame. The encryption data frame includes a counter portion and a Hash-based Message Authentication Code (HMAC) signature. The counter portion is employed as a public nonce while the HMAC is used to verify the boundaries of each 128-bit frame and authenticate the data in the frame.

Figure 1:
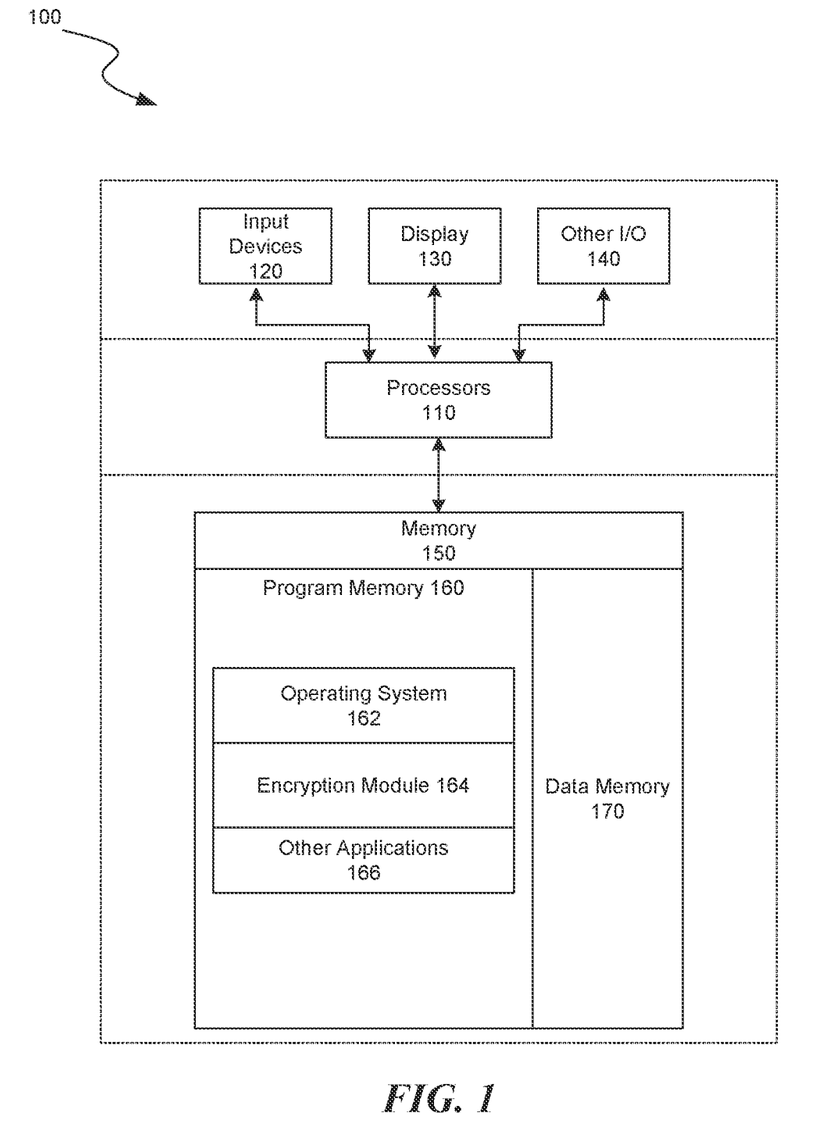
FIG. 1 is a block diagram illustrating an overview of devices on which some implementations of the present technology can operate.

Several implementations of the present technology are discussed below in more detail in reference to the figures. FIG. 1 is a block diagram illustrating an overview of devices on which some implementations of the disclosed technology can operate. The devices can comprise hardware components of a device 100 that transparently encrypts audio data. Device 100 can include one or more input devices 120, including microphones, that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, a sensor (e.g., an infrared sensor), a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, encryption module 164, and other application programs 166. Memory 150 can also include data memory 170, e.g., the PCM streaming audio data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
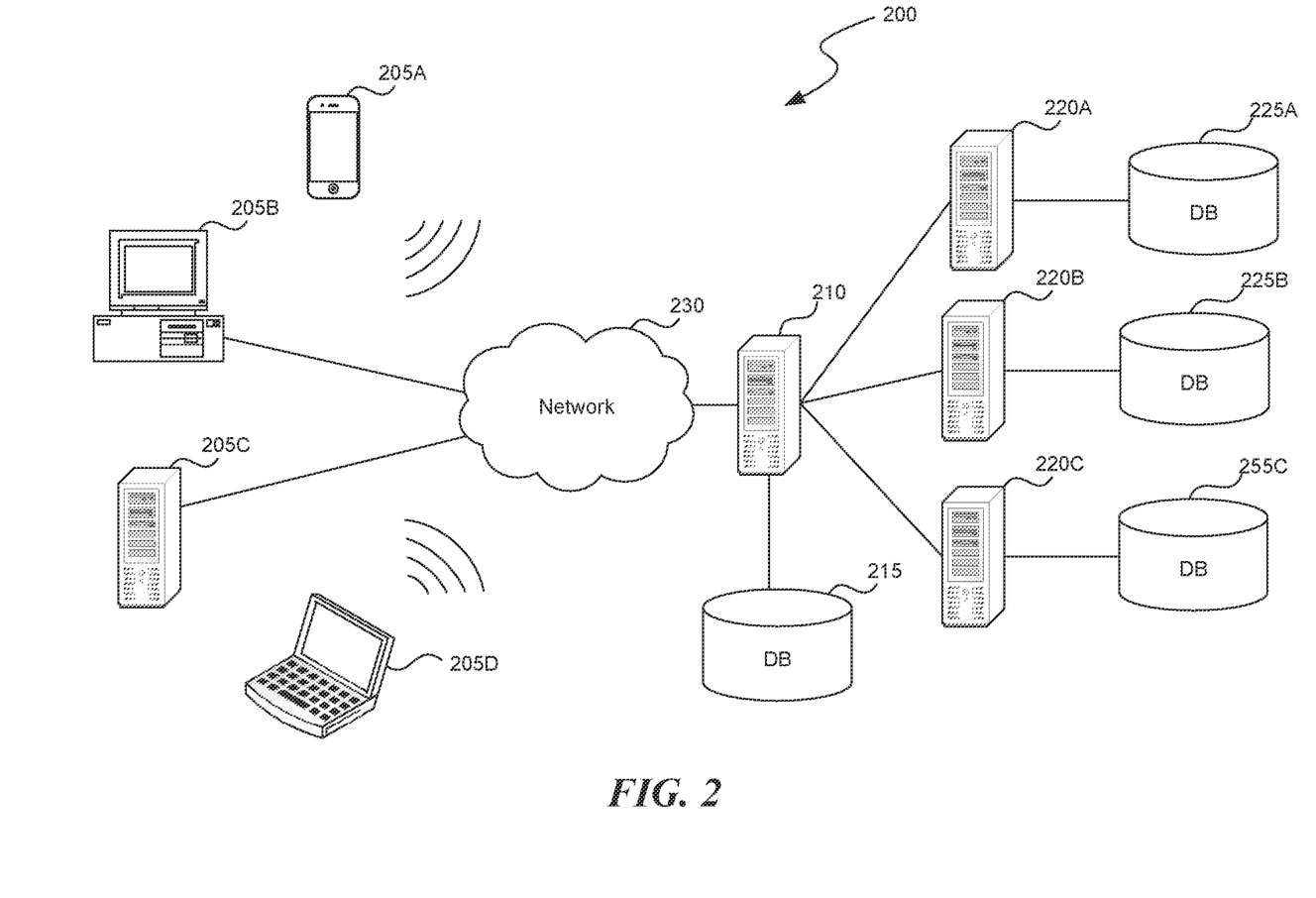
FIG. 2 is a block diagram illustrating an overview of an environment in which some implementations of the present technology can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as encryption keys, user addresses, or encryption protocols. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN) but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
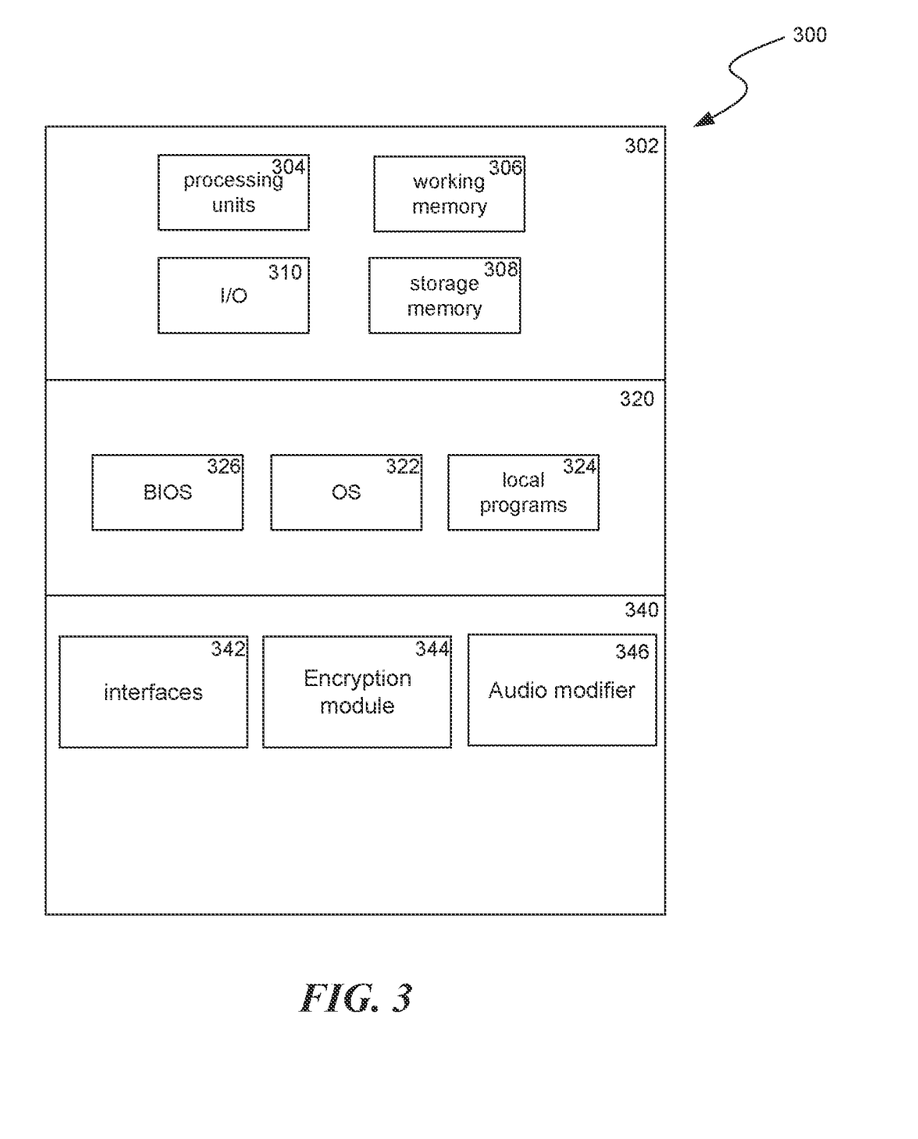
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310 including microphones and/or cameras. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an encryption module 344, audio modifier 346, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

The encryption module 344 is configured to encrypt the PCM audio data according to standards such as AES, Data Encryption Standard (DES), Triple DES, Blowfish, Twofish, RSA (Rivest-Shamir-Adleman), etc. The encryption module 344 makes use of a counter that is used as a randomizing element (e.g., a nonce) and an HMAC to verify the bounds of each frame and authenticate the frame. In some embodiments, frames are 128-bit. Encryption keys are shared via a process external to this application. The encryption module 344 may be implemented as software, firmware, or an ASIC.

The audio modifier 346 is configured to modify PCM audio to drop a predetermined number of bits per frame (e.g., 2, 4 or other selected number of bits per frame) from each sample. In one embodiment, the dropped bits are from the least significant bits of the audio stream and make little difference to the overall quality of the audio for all but the most discerning listeners. Human ears are largely incapable of noticing the difference. In other embodiments, the dropped bits can be from other selected portion of the samples. The audio modifier 346 may be implemented as software, firmware, or an ASIC.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
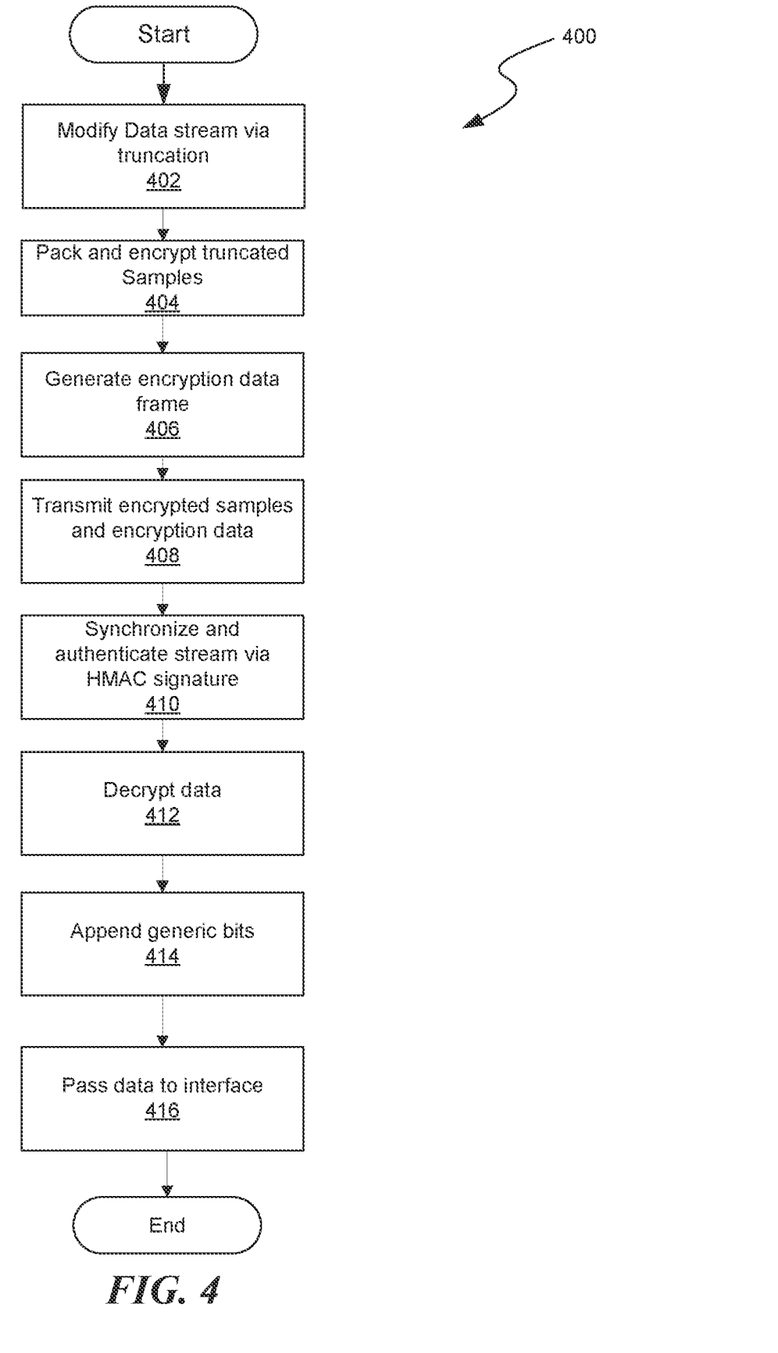
FIG. 4 is a flow diagram illustrating a process used in some implementations of the present technology for encrypting live data streams.

FIG. 4 is a flow diagram illustrating a process 400 used in some implementations for encrypting live data streams. In some implementations, process 400 can be performed "just in time," e.g. as a response to received audio data. When audio data is received and converted from an analog signal to a digital signal, prior to being transmitted to connected users, the system performs the subject protocol. Prior to execution of the subject protocol, master encryption keys are shared with relevant parties to the communication (e.g., via HTTPS or SRTP key derivation). In some embodiments, an asymmetric key pair is used in conjunction with each HMAC to verify frames and sender. In various embodiments, the master encryption key is the same or different as the asymmetric keys associated with the HMAC.

In step 402, PCM audio is modified. The modification includes dropping/truncating bits from data samples (e.g., audio). The bits dropped are application specific and depend on where sensitivity lies with a given application. For example, in some embodiments, the bits dropped are at the least significant bits of the sample consistently with falling outside of a human's audible range. The truncation removes the audio data in the dropped bits entirely from the stream and the resulting audio samples will have a lower resolution. This drop in resolution, however, will typically be substantially undetectable by the listener. In some embodiments the signal is first dithered to mask the removal of the bits.

While audio data is expressly called out in descriptions of some embodiments, in other embodiments, other data may be used with the stipulation that the data is comprehensible when some of the data (e.g., the truncated bits) is discarded. For example, uncompressed data in which discarded portions of the data have the effect of reducing resolution or precision are acceptable. In contrast, data streams in which discarded data disrupts code words or an associated codec (e.g., such as those used in data compression techniques) will cease to be legible.

In some embodiments making use of 24-bit PCM audio data, 2 bits are truncated from each sample (e.g., so each sample is now 22 bits). The final result of the disclosed protocol will introduce additional latency to a data stream. Each additional truncated bit will have a resultant effect of reducing the latency penalty at the cost of additional resolution. That is, if 4 bits are truncated instead of 2 bits, the effect on latency of the audio encryption is reduced, but the data sample loses resolution corresponding to the number of truncated bits.

In step 404, a set of truncated samples are packed into frames and encrypted via a predetermined encryption protocol (e.g., AES-128, AES-256, DES, Triple DES, Blowfish, Twofish, RSA). In some embodiments, there are 64 samples in a set. The number of samples in the set may vary and is based the "bit savings" from truncating data samples. For example, the frame size divided by the number of truncated bits from each sample indicates how many samples in a set. Where frames of audio are 128-bit, and each audio sample is 24-bits with a 2-bit truncation, 11 frames (including 64 samples) are encrypted before including an encryption data frame. The receiver will wait to receive the 64 samples before decrypting and that wait drives the increase in latency. By increasing the bit truncation as described above, the number of frames that are required to transmit the data is reduced. For example, using 128-bit frames and 24-bit samples with 4-bit truncation, only 5 frames are required to contain 32 samples (128/4=32). The resultant latency is reduced by 6 frames.

The packing step revises the alignment of each sample to a respective frame based on the applied bit savings in response to truncation. Each sample (other than the first) is arranged in the resultant frames differently than the respective sample would otherwise be positioned without truncation. For example, where 64 samples are used in a set, pre 2-bit truncation roughly 5.3 samples align to a given frame. Comparatively, after a 2-bit truncation, 5.8 samples align in each frame.

The encryption step makes use of an incrementing counter that acts as a nonce for the streaming data. The counter is included in the encryption data frame that comes after each set of 64 samples. The counter-nonce is used to alter the data such that matching data does not appear the same each time it appears. For example, with audio data, without a nonce, silence would always appear as an identical sample. In some embodiments, the counter appears in the encryption data frame unencrypted.

In step 406, the system generates the encryption data frame. The encryption data frame is similarly 128-bit containing a 64-bit counter and a 64-bit HMAC signature. To generate the encryption data frame, the counter is incremented from the previous encryption data frame, and the HMAC is calculated based on the sender's private key and the associated set of samples.

In step 408, the set of samples and the encryption data frame are transmitted to the receiver. In step 410, the receiver synchronizes with the data stream by calculating the HMAC of the stream and comparing to proposed packets. In cases where the data stream is unreliable, or the packets are received out of order, the HMAC enables the receiver to verify contents and verify sender. In step 412, the receiver decrypts the data using the counter. In the above examples where 24-bit audio including a 2-bit truncation is used, the 64 samples translate from 1408 encrypted bits of audio to a matching 1408 bits of decrypted audio. In step 1414, the receiver appends generic padding bits (e.g. all 1's, all 0's, random bits, or some predetermined combination of bits) to the samples replacing those that had been truncated (e.g., from the same position) in order to return the samples to the expected size. In step 1416, the set of samples, back to the original size, are passed to an audio interface (ex: Audinate Dante®, AES-3, AES-67 or QSC Q-LAN™) to be played.

Figure 5:
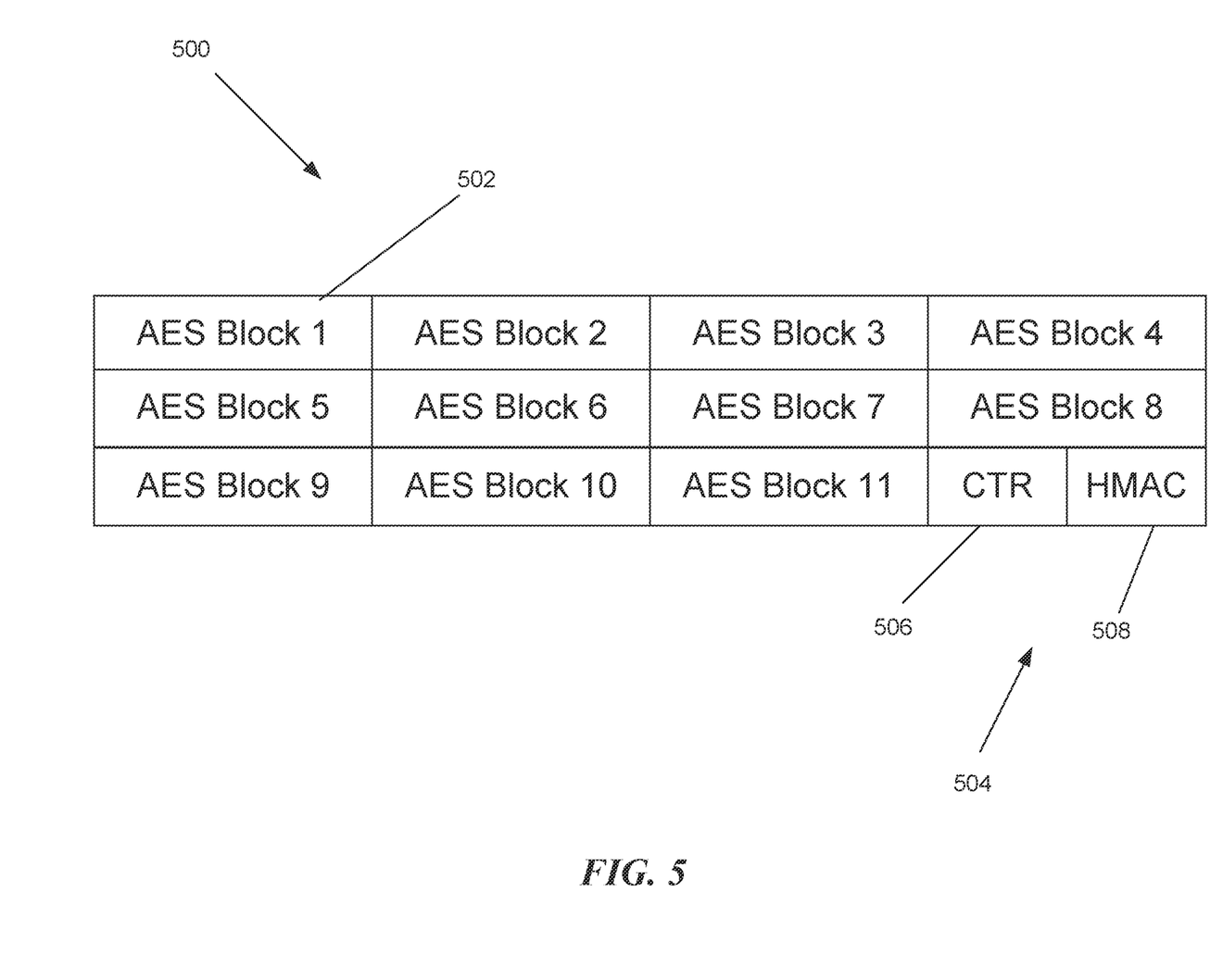
FIG. 5 is block illustration of data stream packets.

FIG. 5 is block illustration of data stream packets 500. A segment of a data stream includes a predetermined number of data samples. The figure depicts twelve 128-bit frames including eleven data frames 502. The figure includes one encryption data frame 504. The encryption data frame 504 include two parts, a counter 506 and a HMAC signature 508.

Each of the data frames 502 includes a set of data samples. In some embodiments, there are 64 samples in a set. The number of samples in the set may vary and is based the "bit savings" from truncating the data samples. For example, the frame size divided by the number of truncated bits from each sample indicates how many samples in a set. Where data frames 502 are 128-bit and each data sample is 24-bits with a 2-bit truncation, eleven data frames 502 (as pictured in the figure) are included for each encryption data frame 504. The receiver will wait to receive the 64 samples before decrypting and that wait drives the increase in latency. By increasing the bit truncation as described above, the number of frames that are required to transmit the data is reduced. For example, using 128-bit frames and 24-bit samples with 4-bit truncation, only five frames are required to contain 32 samples (128/4=32). Were that example to be pictured, only six frames would be depicted.

Figure 6A:
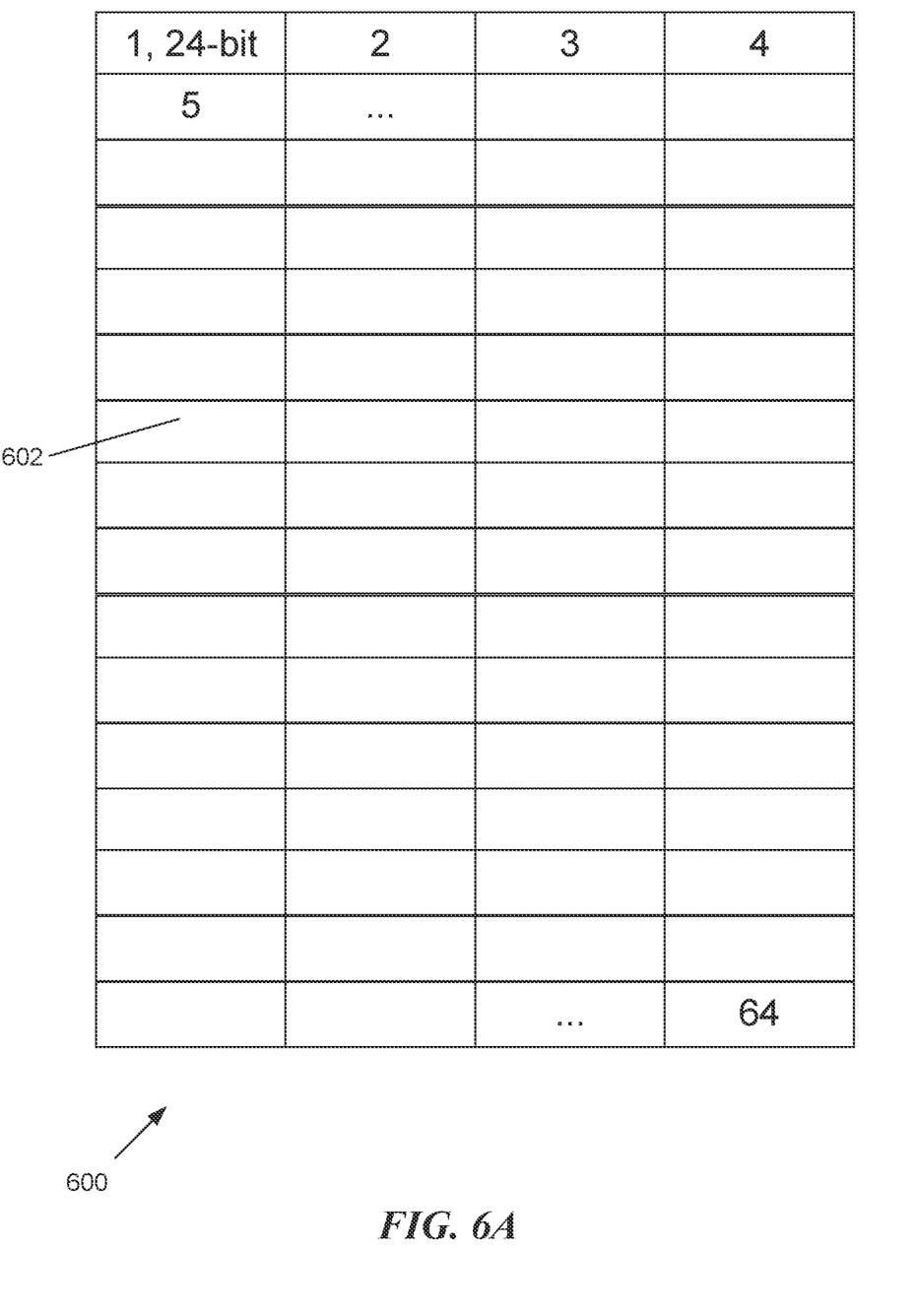
FIG. 6A is a block diagram of a set of samples.

FIGS. 6A-F are block illustrations of various steps of some implementations of the disclosed protocol. FIG. 6A is a block diagram of a set of samples 600. Following the example that makes use of 64 24-bit samples, each sample 602 is pictured as requiring a representative amount of space. In practice, the space occupied by each sample is temporal as opposed to physical.

Figure 6B:
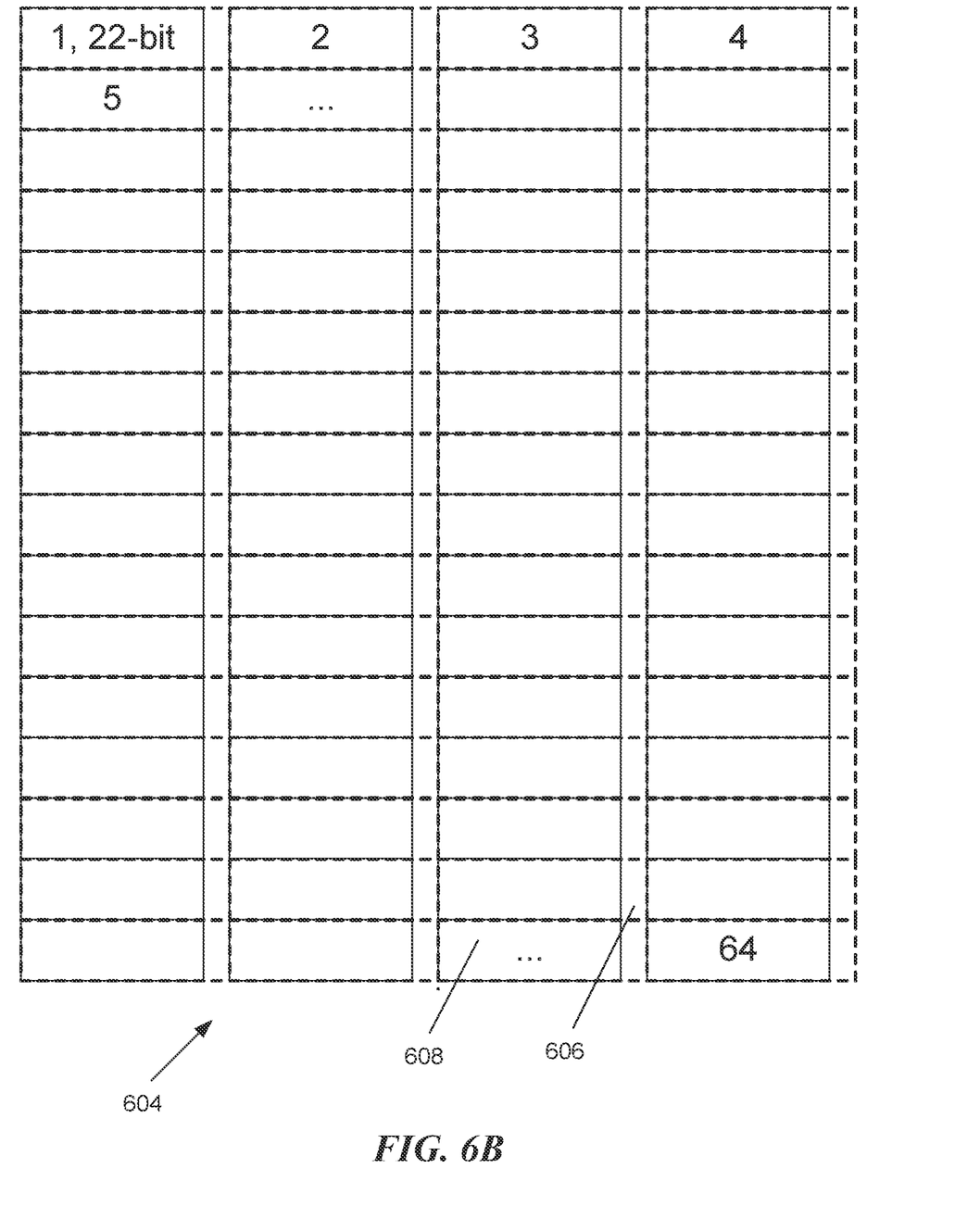
FIG. 6B is a block diagram of the set of samples after truncation.
Figure 6C:
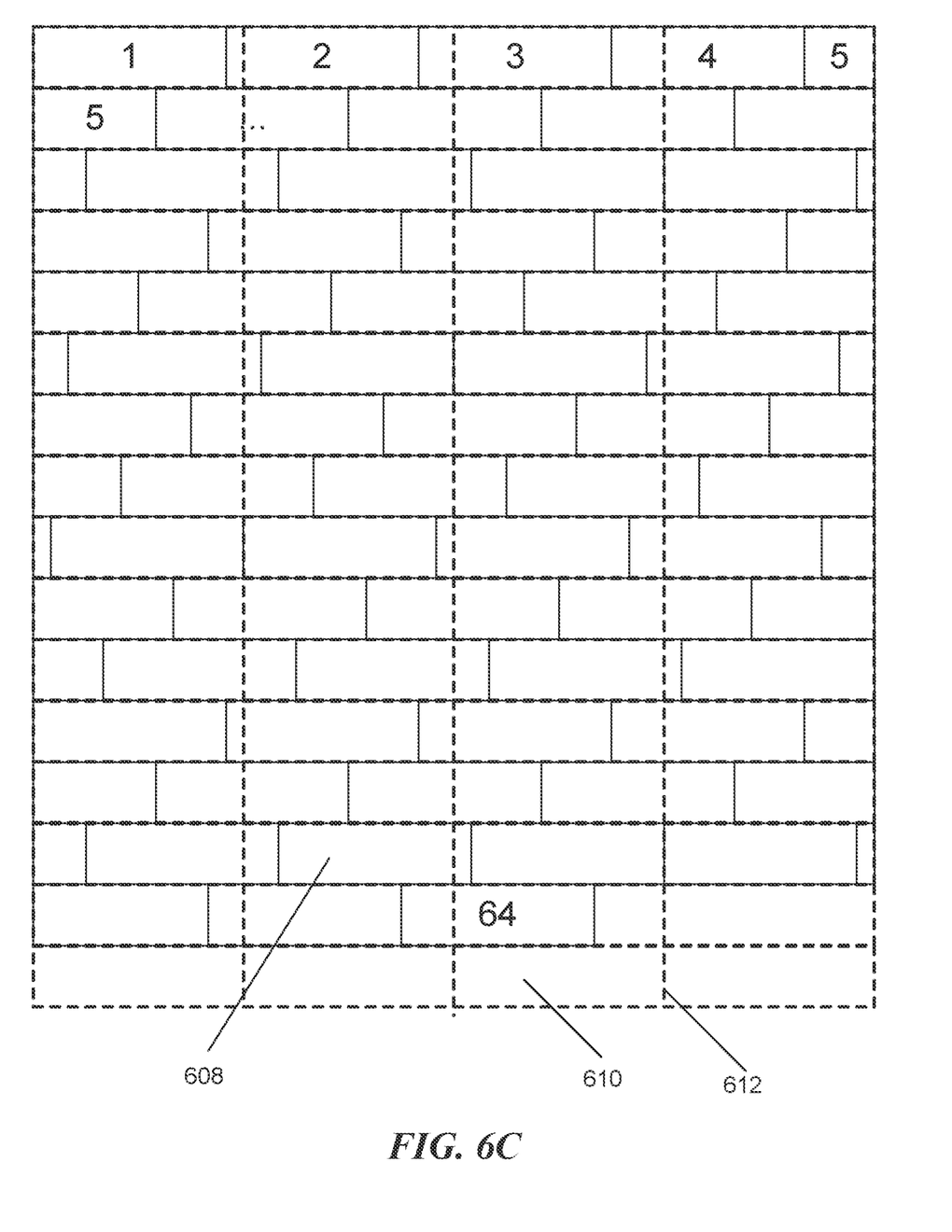
FIG. 6C is a block diagram of the truncated set of samples superimposed over the space required for the samples of FIG. 6A.

FIG. 6B is a block diagram of the set of samples after truncation 604. Each sample has been reduced by 2 bits on the right side leaving some blank space 606 open between each sample. A set of truncated samples 608 remain. FIG. 6C is a block diagram of the truncated set of samples 608 superimposed over the space 610 required for the samples of FIG. 6A. Dotted lines 612 indicate the space previously occupied by corresponding unmodified samples 602. The truncated samples 608 are aligned as pictured to illustrate that each (other than the first) now occupies different space in the stream than previous.

Figure 6D:
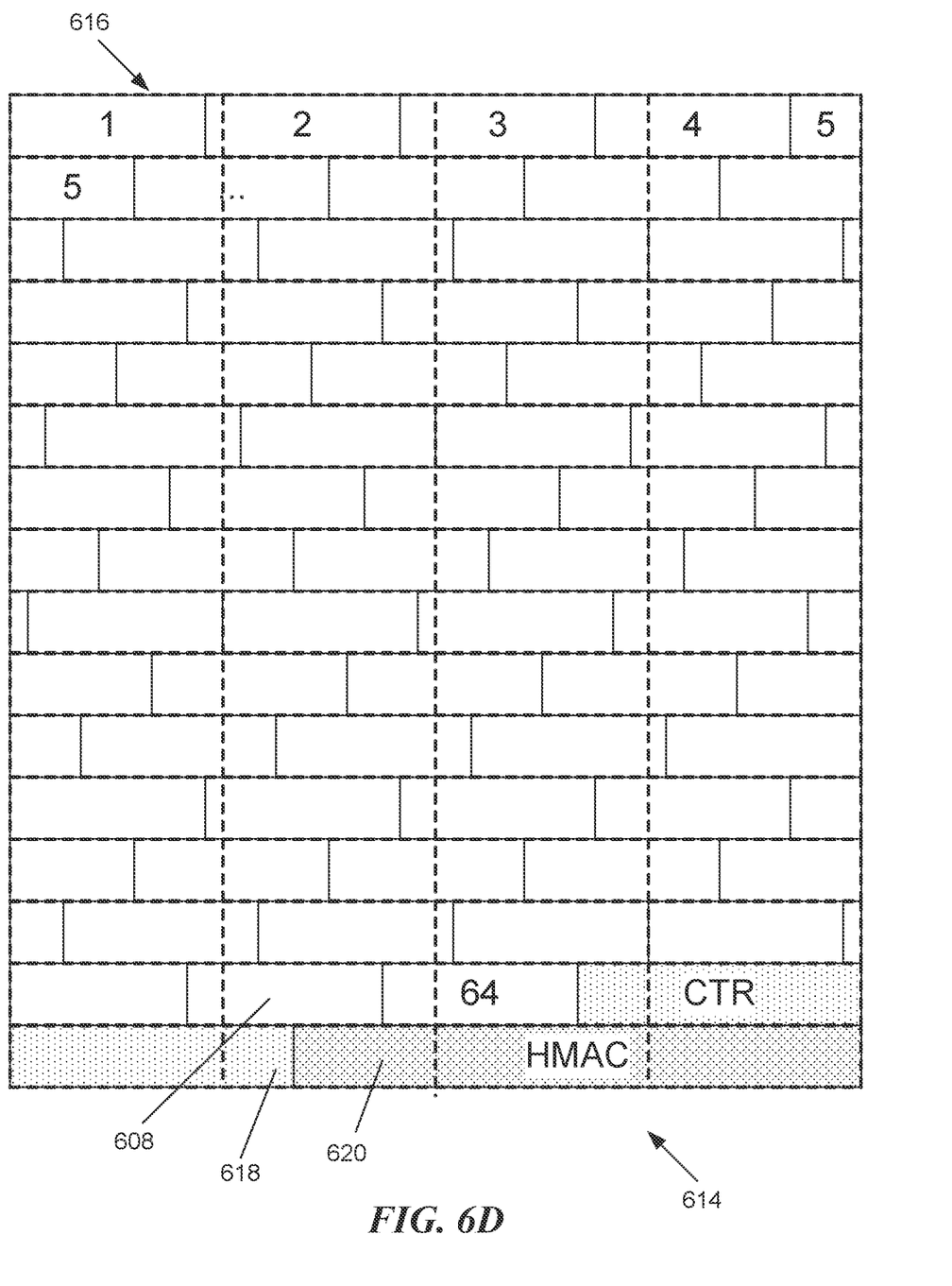
FIG. 6D is a block diagram of the truncated set of samples combined with encryption data representing a data stream unit.
Figure 6E:
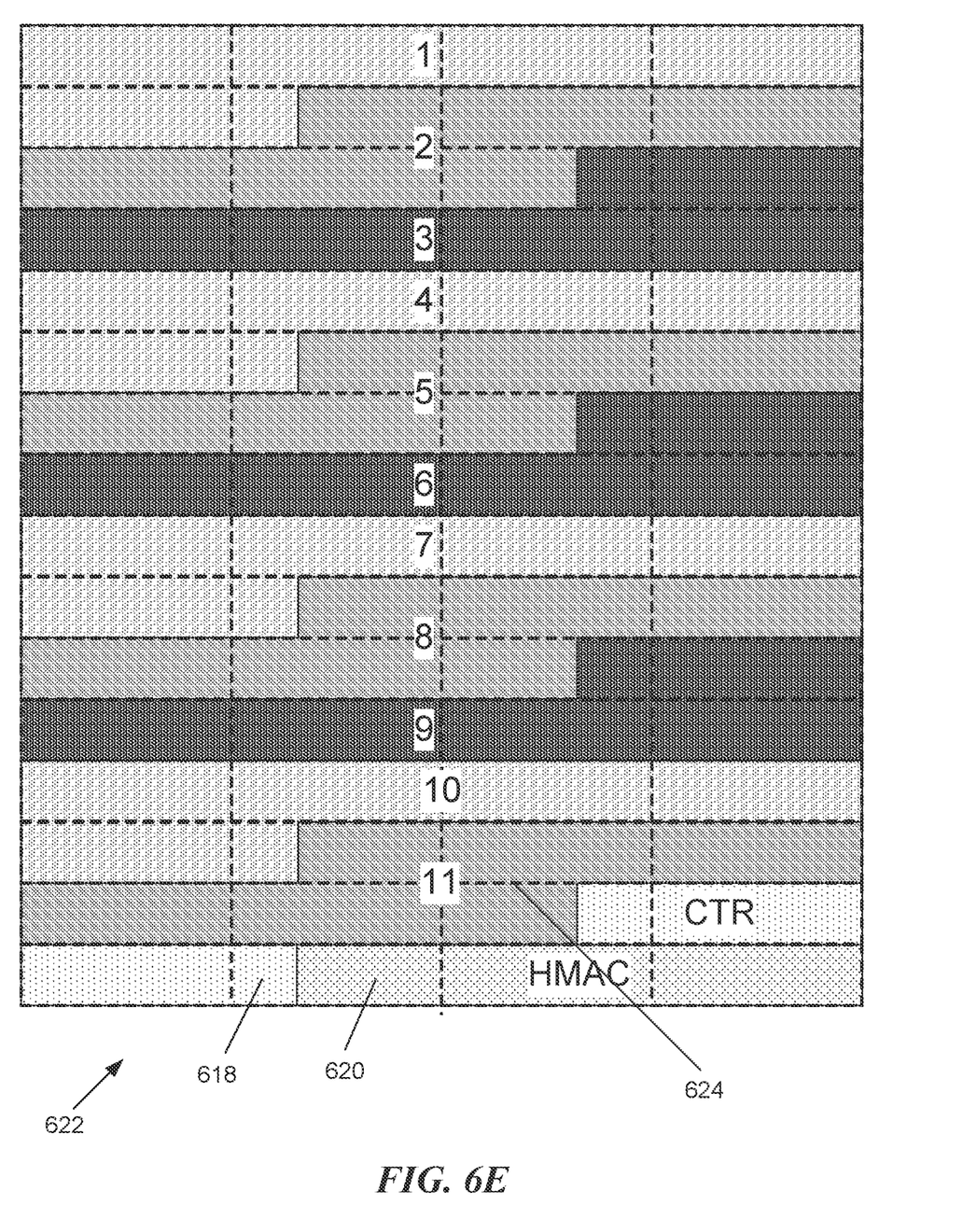
FIG. 6E is a block diagram illustrating the data stream unit packed into 128-bit data frames.

FIG. 6D is a block diagram of the truncated set of samples 608 combined with encryption data 614 representing a data stream unit 616. The encryption data 614 includes a 64-bit counter 618 and a 64-bit HMAC 620 appended to the end of the data stream unit 616. FIG. 6E is a block diagram illustrating the data stream unit packed 622 into 128-bit data frames. Each of the truncated samples 608 is now arranged into one or more of 11 frames 624 for transmission. Each individual truncated sample 608 does not necessarily fit cleanly into the frames 624. A number of truncated samples 608 are split across adjacent frames 624. After all the frames the counter 618 and the HMAC 620 are aligned into a single, twelfth frame.

Figure 6F:
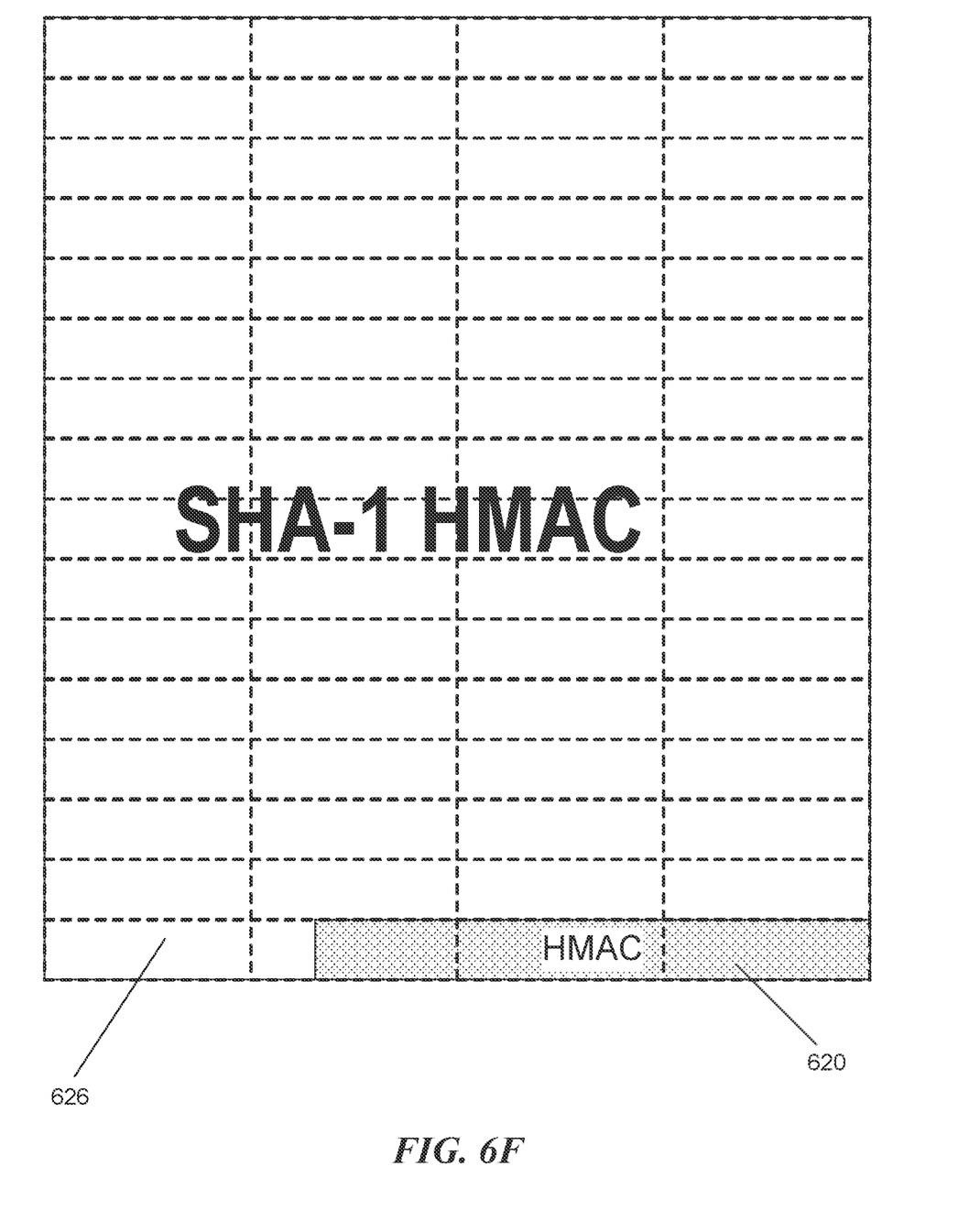
FIG. 6F is a block diagram illustrating structure of an HMAC authentication protocol.

FIG. 6F is a block diagram illustrating structure of an HMAC authentication protocol. FIG. 6F depicts a receiver side representation of the data stream unit 616. The eleven frames 624 including the truncated samples 608 are encrypted together 626 for purposes of generation of the HMAC 620. The HMAC 620 is used to authenticate the set of samples. The figure displays the set of encrypted samples 626 as making using of the Secure Hashing Algorithm (SHA-1) hashing technique to generate the HMAC 620. Other hashing algorithms may be used in place of SHA-1, For example, numerous other SHA algorithms exist (e.g., SHA-0, SHA-2, SHA-3), Message Digest (MD5), or other suitable hashing algorithms known in the art may be used.

Based on the way the data stream arrives at the receiver, there needs a way to determine the boundaries of the data in order to correctly decrypt. To accomplish this, the receiver first buffers the data stream unit 616. In the depicted example, the data stream unit 616 is 1536 bits (12 frames at 128-bits each). The HMAC 620 is that last 64 bits of the data stream unit 616 and is computed on the first 1472 bits (the eleven 128-bit data frames plus the 64-bit counter). To authenticate, one compares the first 64 bits of the computed HMAC to the last 64 bits of the buffered data stream unit 616. Notably various hashing algorithms will compute the HMAC to different sizes. SHA-1 outputs a 160-bit result. The transmitted HMAC 620 in the data stream unit 6161 is merely the first 64-bits of the hashing algorithm output.

If the HMAC 620 is valid, that means the encrypted audio buffer can the decrypted. If the HMAC 620 isn't valid the receiver shifts the buffer framing by a predetermined amount and tries to verify the HMAC 620 again. In some embodiments, the buffer framing shift may slide the buffer forward by 24 bits while receiving another 24 bits to append to the end or a more random shifting could occur. The HMAC 620 can also used to verify the transmitter of the data. In some embodiments, The HMAC 620 has an algorithmic relationship to the sender's public key.

Once the HMAC is verified the decryption is simply the reverse of the encrypting stage. The counter 618 is used as the top 64 bits of the initialization vector (IV) in a counter mode block decryption. The lower 64 bits of the IV are 0 based 128-bit indexes into buffer (it starts at 0 and goes to 10). After decryption the audio can be unpacked and each 22 bit sample expanded back to 24 bits (e.g., using padded bits) and played out the system.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The invention claimed is:

1. A method comprising:
   reducing a predetermined bit resolution of audio samples included in an audio stream, resulting in a set of reduced bit resolution audio samples, wherein the audio stream is configured for transmission at a predetermined frame size;
   encrypting the set of reduced bit resolution audio samples;
   supplementing the set of encrypted reduced bit resolution audio samples with encryption data frames, the encryption data frames occurring at a frequency in a modified audio stream based on a number of bits reduced from each audio sample and the predetermined frame size, the modified audio stream including the set of encrypted reduced bit resolution audio samples and the encryption data frames; and
   transmitting the modified audio stream.

2. The method of claim 1, further comprising:
   in response to said transmitting, receiving modified audio stream including the set of encrypted reduced bit resolution audio samples and the encryption data frames;
   synchronizing the set of encrypted reduced bit resolution audio samples based on the encryption data frames;
   decrypting the set of encrypted reduced bit resolution audio samples;
   restoring the bit resolution of the set of reduced bit resolution audio samples using generic bits matching a number of bits reduced from the audio samples, resulting in an audio stream including audio samples with the generic bits and having the predetermined bit resolution; and
   passing the audio stream including the audio samples with the generic bits and having the predetermined bit resolution to a receiver audio interface.

3. The method of claim 1, wherein the encryption data frames include a Hash-based Message Authentication Code (HMAC) signature portion and a counter portion.

4. The method of claim 1,
   wherein the predetermined frame size is 128 bits, the predetermined bit resolution is 24-bit, and the number of bits reduced from each audio sample is 2 bits; and
   wherein the frequency of the encryption data frames occur is every twelfth frame.

5. The method of claim 1, wherein said reducing the predetermined bit resolution comprises:
   truncating a predetermined number of bits from the end of each audio sample.

6. The method of claim 5, further comprising:
   determining a latency based on the predetermined number of bits truncated from the end of each audio sample.

7. The method of claim 1, wherein each step of the method is performed just-in-time.

8. The method of claim 1, further comprising:
   exchanging encryption keys between a transmitter and a receiver of the audio stream.

9. A system comprising:
   a processor;
   an audio stream input interface configured to receive an audio stream;
   a communication interface configured to transmit a modified audio stream; and
   a memory including protocol instructions that when executed cause the processor to:
      reduce a predetermined bit resolution of a set of audio samples included in the audio stream, the reduction resulting in a set of reduced bit resolution audio samples, wherein the audio stream is configured for transmission at a predetermined frame size;
      encrypt the set of reduced bit resolution audio samples; and
      augment the set of encrypted reduced bit resolution audio samples with encryption data frames, the encryption data frames occurring at a frequency in the reduced bit resolution audio stream based on a number of bits reduced from each audio sample and the predetermined frame size, the augmentation of the set of reduced bit resolution audio samples resulting in the modified audio stream including the set of encrypted reduced bit resolution audio samples and the encryption data frames.

10. The system of claim 9, further comprising:
    an audio stream receiver interface configured to receive the transmitted modified audio stream including the set of encrypted reduced bit resolution audio samples and the encryption data frames and synchronize the set of encrypted reduced bit resolution audio samples based on the encryption data frames,
    wherein the audio stream receiver interface is further configured to decrypt the set of encrypted reduced bit resolution audio samples and restore the bit resolution of the reduced bit resolution audio samples using generic bits matching a number of bits reduced from the audio samples, the restoration resulting in an audio stream including audio samples with generic bits and having the predetermined bit resolution; and wherein the audio stream receiver interface is further configured for playback of the audio stream including the audio samples with generic bits and having the predetermined bit resolution.

11. The system of claim 9, wherein the encryption data frames include a Hash-based Message Authentication Code (HMAC) signature portion and a counter portion.

12. The system of claim 9, wherein the predetermined frame size is 128 bits, the predetermined bit resolution is 24-bit, and the number of bits reduced from each audio sample is 2 bits; and wherein the frequency of the encryption data frames occur is every twelfth frame.

13. The system of claim 9, wherein said reduction of the predetermined bit resolution comprises:

truncation of a predetermined number of bits from the end of each audio sample.

14. The system of claim 9, wherein the protocol instructions are executed by the processor just-in-time.

15. A method of operating an audio stream encryption protocol comprising:

reducing, by an audio stream input interface, a predetermined bit resolution of audio samples included in an audio stream via truncation of a predetermined number of bits from the end of each audio sample, resulting in a set of reduced bit resolution audio samples, wherein the audio stream is configured for transmission at a predetermined frame size;

encrypting, by the audio stream input interface, the set of reduced bit resolution audio samples, said encryption including augmentation of the set of reduced bit resolution audio samples with encryption data frames, the encryption data frames occurring at a frequency in a modified audio stream based on a number of bits reduced from each audio sample and the predetermined frame size, the modified audio stream including the set of encrypted reduced bit resolution audio samples and the encryption data frames;

transmitting, by the audio stream input interface to an audio stream receiver interface, the modified audio stream;

synchronizing, by the audio stream receiver interface, the set of encrypted reduced bit resolution audio samples based on the encryption data frames;

decrypting, by the audio stream receiver interface, the set of encrypted reduced bit resolution audio samples;

in response to said decrypting, restoring, by the audio stream receiver interface, the bit resolution of the set of reduced bit resolution audio samples using generic bits matching the predetermined number of bits, resulting in an audio stream including audio samples with generic bits and having the predetermined bit resolution; and playing, by the audio stream receiver interface, the audio stream including audio samples with generic bits and having the predetermined bit resolution.

16. The method of claim 15, wherein the encryption data frames include a Hash-based Message Authentication Code (HMAC) signature portion and a counter portion.

17. The method of claim 15, wherein the predetermined frame size is 128 bits, the predetermined bit resolution is 24-bit, and the number of bits reduced from each audio sample is 2 bits; and wherein the frequency of the encryption data frames occur is every twelfth frame.

18. The method of claim 15, further comprising:

determining a latency based on the predetermined number of bits truncated from the end of each audio sample.

19. The method of claim 15, wherein each step of the method is performed just-in-time.

20. The method of claim 15, further comprising:

exchanging encryption keys between the audio stream input interface and the audio stream receiver interface.

\* \* \* \* \*